(12) United States Patent
Strickland et al.

(10) Patent No.: US 10,301,483 B2
(45) Date of Patent: May 28, 2019

(54) ANTISTATIC COATED POLYESTER FILM

(71) Applicant: DUPONT TEIJIN FILMS U.S. LIMITED PARTNERSHIP, Chester, VA (US)

(72) Inventors: Debra S. Strickland, Richmond, VA (US); Julian Neal Robinson, Easby (GB); Jackie H. Symonds, North Yorkshire (GB); Cornell Chappell, Jr., Petersburg, VA (US)

(73) Assignee: DUPONT TEIJIN FILMS U.S. LIMITED PARTNERSHIP, Chester, VA (US)

( * ) Notice: Subject to any disclaimer, the term of this patent is extended or adjusted under 35 U.S.C. 154(b) by 50 days.

(21) Appl. No.: 15/111,221

(22) PCT Filed: Feb. 4, 2015

(86) PCT No.: PCT/US2015/014411
§ 371 (c)(1),
(2) Date: Jul. 13, 2016

(87) PCT Pub. No.: WO2015/120018
PCT Pub. Date: Aug. 13, 2015

(65) Prior Publication Data
US 2016/0333196 A1  Nov. 17, 2016

Related U.S. Application Data

(60) Provisional application No. 61/937,154, filed on Feb. 7, 2014.

(51) Int. Cl.
*C09D 133/06* (2006.01)
*C09D 133/08* (2006.01)
(Continued)

(52) U.S. Cl.
CPC ............... *C09D 5/24* (2013.01); *B32B 27/08* (2013.01); *B32B 27/20* (2013.01); *B32B 27/36* (2013.01); *C08J 7/047* (2013.01); *C09D 7/63* (2018.01); *C09D 171/02* (2013.01); *B32B 27/18* (2013.01); *B32B 27/30* (2013.01); *B32B 27/308* (2013.01); *B32B 2250/02* (2013.01); *B32B 2250/03* (2013.01); *B32B 2255/10* (2013.01); *B32B 2255/26* (2013.01); *B32B 2307/21* (2013.01); *B32B 2307/518* (2013.01); *B32B 2333/00* (2013.01); *B32B 2333/04* (2013.01); *B32B 2367/00* (2013.01); *C08J 2367/02* (2013.01); *C08J 2371/02* (2013.01); *C08J 2379/02* (2013.01); *C08J 2471/02* (2013.01); *C08J 2479/02* (2013.01); *C08K 5/0075* (2013.01); *C08K 5/09* (2013.01); *C08K 5/098* (2013.01); *C08K 5/17* (2013.01); *C08K 5/19* (2013.01); *C08K 5/20* (2013.01); *C08K 2201/001* (2013.01); *C08K 2201/017* (2013.01); *C08L 33/04* (2013.01); *C08L 33/06* (2013.01);
(Continued)

(58) Field of Classification Search
None
See application file for complete search history.

(56) References Cited

U.S. PATENT DOCUMENTS 3,382,096 A     5/1968  Boardman
3,954,633 A *   5/1976  Dollinger ............ D06M 13/467
                                              252/8.61

(Continued)

FOREIGN PATENT DOCUMENTS

CN    1649990 A    8/2005
EP    0408197      1/1991
(Continued)

OTHER PUBLICATIONS

International Search Report and Written Opinion for International Application No. PCT/US2015/014411, dated May 12, 2015, 11 pages.
(Continued)

*Primary Examiner* — Vivian Chen
(74) *Attorney, Agent, or Firm* — RatnerPrestia

(57) ABSTRACT

An antistatic polyester film includes a self-supporting polyester substrate film bearing on at least one surface thereof an antistatic layer including a) one or more antistatic polymers comprising repeat units according to formula (I) wherein $R^1$ and $R^2$ are each independently H or $CH_3$, $R^3$ is an alkylene group having a carbon number in a range from 2 to 10, $R^4$ and $R^5$ are each independently a saturated hydrocarbon group having a carbon number in a range from 1 to 5, $R^6$ is an alkylene group having a carbon number in a range from 2 to 5, n is an integer in a range from 0 to 40, m is an integer in a range from 1 to 40, and Y" is a halogen ion, nitrate ion, sulfate ion, alkylsulfate ion, sulfonate ion, alkylsulfonate ion or dihydrogen phosphate ion; b) one or more nonpolymeric cationic antistatic agents; and c) one or more crosslinkers.

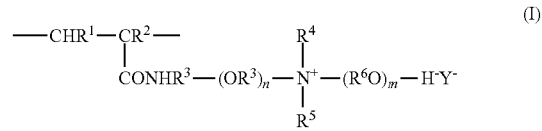

17 Claims, No Drawings

(51) Int. Cl.
| | | |
|---|---|---|
| C09D 139/00 | (2006.01) | |
| C09D 5/00 | (2006.01) | |
| C09D 5/24 | (2006.01) | |
| C09D 133/04 | (2006.01) | |
| B32B 27/08 | (2006.01) | |
| B32B 27/18 | (2006.01) | |
| B32B 27/20 | (2006.01) | |
| B32B 27/30 | (2006.01) | |
| B32B 27/36 | (2006.01) | |
| C08K 5/098 | (2006.01) | |
| C08L 33/04 | (2006.01) | |
| C08L 33/06 | (2006.01) | |
| C08L 33/08 | (2006.01) | |
| C08L 39/00 | (2006.01) | |
| C08K 5/19 | (2006.01) | |
| C08K 5/17 | (2006.01) | |
| C08K 5/09 | (2006.01) | |
| C08K 5/00 | (2006.01) | |
| C08J 7/04 | (2006.01) | |
| C09D 171/02 | (2006.01) | |
| C09D 7/63 | (2018.01) | |
| C08K 5/20 | (2006.01) | |

(52) U.S. Cl.
CPC ............ C08L 33/08 (2013.01); C08L 39/00 (2013.01); C09D 5/00 (2013.01); C09D 133/04 (2013.01); C09D 133/06 (2013.01); C09D 133/08 (2013.01); C09D 139/00 (2013.01); Y10T 428/31786 (2015.04); Y10T 428/31797 (2015.04); Y10T 428/31935 (2015.04)

(56) References Cited

U.S. PATENT DOCUMENTS

| | | | | |
|---|---|---|---|---|
| 4,089,997 A | * | 5/1978 | Van Paesschen | B29C 55/026 427/171 |
| 4,214,035 A | * | 7/1980 | Heberger | C08J 7/047 427/171 |
| 4,494,651 A | * | 1/1985 | Malcolm | H05K 9/0067 206/719 |
| 4,642,263 A | * | 2/1987 | Culbertson | C08J 7/047 428/336 |
| 5,130,177 A | * | 7/1992 | Lu | G03G 5/101 428/195.1 |
| 5,202,193 A | * | 4/1993 | Sumi | C08F 8/44 428/304.4 |
| 5,476,988 A | * | 12/1995 | Hart | B01D 21/01 208/180 |
| 5,709,926 A | * | 1/1998 | Gust | B41M 5/52 427/412.1 |
| 5,882,798 A | | 3/1999 | Hubbard | |
| 5,882,800 A | * | 3/1999 | Brennan | C08J 7/047 428/480 |
| 5,925,428 A | | 7/1999 | Hubbard | |
| 5,925,447 A | | 7/1999 | Gust | |
| 6,103,368 A | * | 8/2000 | Fukuda | B32B 27/36 428/337 |
| 6,358,660 B1 | * | 3/2002 | Agler | B41M 5/0256 156/240 |
| 7,211,309 B2 | | 5/2007 | Kitazawa et al. | |
| 7,381,697 B2 | | 6/2008 | Lentsch et al. | |
| 2002/0058194 A1 | * | 5/2002 | Williams | B41M 5/025 430/138 |
| 2004/0089590 A1 | * | 5/2004 | Calvert | B01D 21/01 208/289 |
| 2004/0221945 A1 | * | 11/2004 | Williams | B41M 5/0256 156/235 |
| 2005/0003163 A1 | * | 1/2005 | Krishnan | A01N 25/10 428/190 |
| 2006/0035070 A1 | | 2/2006 | Kitazawa | |
| 2008/0226584 A1 | * | 9/2008 | Krishnan | A01N 25/10 424/78.31 |
| 2008/0311385 A1 | * | 12/2008 | Miyazaki | B32B 27/08 428/330 |

FOREIGN PATENT DOCUMENTS

| | | | |
|---|---|---|---|
| EP | 0512540 | | 11/1992 |
| EP | 0678546 | | 6/2000 |
| EP | 0882575 | | 12/2001 |
| EP | 1612238 A1 | | 1/2006 |
| GB | 856120 | * | 12/1960 |
| GB | 1 069 607 | * | 5/1967 |
| JP | H08504384 A | | 5/1996 |
| JP | 09-328597 A | * | 12/1997 |
| JP | 10-101990 A | * | 4/1998 |
| JP | H10330518 A | | 12/1998 |
| WO | 9413477 A1 | | 6/1994 |
| WO | 2004085524 A1 | | 10/2004 |

OTHER PUBLICATIONS

Nippon Shokubai, "Highly reactive polymer: EPOCROS (Oxazoline-functional polymer)", 2009, 5 pages.
Cyastat SN Antistatic Agent, Cytec Industries, Inc., 1990, 2 pages.
Evonik Industries, Mateiral Safety Data Sheet for "Adogen 477E", Oct. 16, 2010, 10 pages.
European Communication Pursuant to Article 94(3) for European Application No. 15704911.5, dated Jan. 25, 2018, 5 pages.
Notice of Reasons for Rejection for Japanese Application No. 2016-550492, dated Oct. 15, 2018, with translation, 7 pages.
Chinese Office Action for Chinese Application No. 201580007630.4, dated Aug. 24, 2018 with translation, 18 pages.

* cited by examiner

ANTISTATIC COATED POLYESTER FILM

CROSS-REFERENCE TO RELATED APPLICATION

This application is the National Phase filing of International Patent Appln. No. PCT/US2015/014411, filed Feb. 4, 2015, and claims the benefit of U.S. Provisional Application No. 61/937,154, filed Feb. 7, 2014, the contents of which applications are incorporated herein by reference in their entireties for all purposes.

BACKGROUND OF THE INVENTION

Polyester films build static charge as they are handled in rolls and sheets. There is a need for aqueous in-line coatings that can more effectively dissipate charge and that are more robust with respect to the permanence of the antistatic coating, i.e., coatings that exhibit less blooming of antistatic component(s) to the surface of the film and/or a lower tendency for antistatic component(s) to transfer to other surfaces as the films are being rolled and/or handled.

SUMMARY OF THE INVENTION

The invention provides an antistatic polyester film that includes a self-supporting polyester substrate film bearing on at least one surface thereof an antistatic layer including
a) one or more antistatic polymers comprising repeat units according to formula (I)

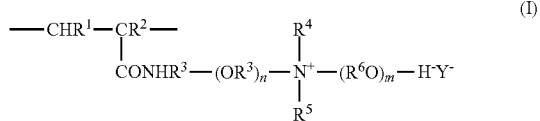

wherein $R^1$ and $R^2$ are each independently H or $CH_3$, $R^3$ is an alkylene group having a carbon number in a range from 2 to 10, $R^4$ and $R^5$ are each independently a saturated hydrocarbon group having a carbon number in a range from 1 to 5, $R^6$ is an alkylene group having a carbon number in a range from 2 to 5, n is an integer in a range from 0 to 40, m is an integer in a range from 1 to 40, and $Y^-$ is a halogen ion, nitrate ion, sulfate ion, alkylsulfate ion, sulfonate ion, alkylsulfonate ion or dihydrogen phosphate ion;
b) one or more nonpolymeric cationic antistatic agents; and
c) one or more crosslinkers.

DETAILED DESCRIPTION OF THE INVENTION

The invention provides antistatic polyester films formed by coating a polyester substrate with an aqueous coating composition comprising a polyquaternary acrylamide antistatic polymer, a crosslinker and a nonpolymeric antistatic agent, followed by drying the coating to form an antistatic layer on the substrate. Films according to the invention provide antistatic performance superior in many aspects to common commercially available films, yet the antistatic properties are remarkably resistant to degradation due to handling, exhibiting excellent antistatic properties and resistance to rub-off. The films, which include a self-supporting polyester film substrate coated with an antistatic composition, are described in detail below.

Polyquaternary Acrylamide Antistatic Polymer

The coating composition includes one or more polyquaternary acrylamide antistatic polymers comprising repeat units according to formula (I)

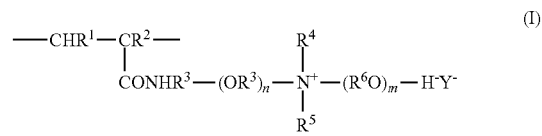

wherein $R^1$ and $R^2$ are each independently H or $CH_3$, $R^3$ is an alkylene group having a carbon number in a range from 2 to 10, $R^4$ and $R^5$ are each independently a saturated hydrocarbon group having a carbon number in a range from 1 to 5, $R^6$ is an alkylene group having a carbon number in a range from 2 to 5, n is an integer in a range from 0 to 40, m is an integer in a range from 1 to 40, and $Y^-$ is a halogen ion, nitrate ion, sulfate ion, alkylsulfate ion, sulfonate ion, alkylsulfonate ion or dihydrogen phosphate ion. In some embodiments, $R^1$ and $R^2$ are each H, $R^3$ is $(CH_2)_3$, n is zero, $R^4$ and $R^5$ are each $CH_3$, and m is 1. In some embodiments, $Y^-$ is $CH_3SO_3^-$.

The repeat units according to formula (I) constitute at least 50 mol % of the repeat units in the polymer, or at least 75 mol %, or at least 90 mol %, or at least 95 mol %, or at least 98 mol %, or 100 mol %. Other repeat units in the polymer may include —$CHR^1$—$CR^2(COOCH_3)$—, —$CHR^1$—$CR^2(COOC_2H_5)$—, and/or —$CHR^1$—$CR^2(CONH_2)$—, where $R^1$ and $R^2$ are as defined above, and/or ethylene units.

Polymers incorporating units according to formula (I) may be obtained as described in U.S. Pat. No. 6,103,368, incorporated herein by reference. An acrylic acid ester is polymerized, optionally with ethylene as comonomer, by emulsion polymerization to obtain a polyacrylic acid ester having a weight-average molecular weight of 2,000 to 100,000. In one example, the polymer is amidated by reacting with an N,N-dialkylaminoalkylamine (e.g., N,N-dimethylaminopropylamine or N,N-diethylaminopropylamine), and the N,N-dialkylamino group on the amidated polymer is subjected to quaternary hydroxyalkylation. The number-average molecular weight of the polymer is typically at least 3,000, or at least 5,000, and typically at most 300,000, or a most 100,000.

The one or more polymers having repeat units according to formula (I) in total constitute at least 5 wt % of the coating composition on a dry solids basis, not including surfactant or any slip particles, or at least 10 wt %, or at least 20 wt %. They constitute at most 40 wt %, or at most 50 wt %, or at most 60 wt %.

Crosslinker

The coating composition includes one or more crosslinkers. These may be organic polymeric crosslinkers, for example polymers bearing multiple carbodiimide, isocyanate, aziridine or oxazoline groups. Examples include oxazoline-functional acrylic polymers, for instance crosslinkers comprising repeat units according to formula (II)

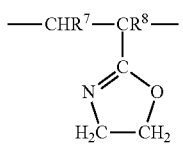

(II)

wherein $R^7$ and $R^8$ are each independently H or $CH_3$. In some embodiments, $R^7$ and $R^8$ are each H. Other suitable crosslinkers include melamine-formaldehyde, benzoguanamine-formaldehyde, glycoluril-formaldehyde, urea-formaldehyde and epoxy to resins, as well as silanes and titanates. Typically, suitable crosslinkers are soluble in water.

The one or more crosslinkers in total constitute at least 0.5 wt % of the coating composition on a dry solids basis, not including surfactant or any slip particles, or at least 1.5 wt %, or at least 3 wt %. They constitute at most 10 wt %, or at most 25 wt %, is or at most 40 wt %.

Nonpolymeric Antistatic Agent

The coating composition includes one or more nonpolymeric cationic antistatic agents, typically quaternary ammonium salts, most typically having only a single quaternary ammonium moiety per molecule, or only two. Suitable examples include stearamidopropyldimethyl-2-hydroxyethylammonium salts, for example the nitrate or dihydrogen phosphate salt.

The one or more nonpolymeric cationic antistatic agents in total constitute at least 30 wt % of the coating composition on a dry solids basis, not including surfactant or any slip particles, or at least 45 wt %, or at least 60 wt %. They constitute at most 75 wt %, or at most 80 wt %, or at most 85 wt %.

Surfactant

One or more surfactants are typically included in an amount sufficient to provide substrate wetting. If present, the surfactant(s) in total will typically constitute at least 0.1 wt % of the coating composition on a dry solids basis, or at least 1 wt %, or at least 2 wt %. They will typically constitute at most 10 wt %, or at most 20 wt %, or at most 60 wt %. In some embodiments, only nonionic surfactants are used, or only cationic surfactants, or a combination of these. Exemplary nonionic surfactants include EMULGEN® A60 Polyoxyethylene distyrenated phenyl ether, a nonionic surfactant available from Kao Specialties Americas, LLC, High Point, N.C. Other suitable surfactants include Tergitol NP-10 from Dow Chemical, CAFLON® NP10 isononylphenyl ethoxylate from Univar Ltd., and SURFYNOL® 104 surfactant from Air Products.

The coating composition is an aqueous composition, and will typically be free of organic solvents. In some embodiments of the invention, it is desirable that certain other ingredients be excluded from the coating composition. For example, it may be necessary to exclude organic silanes, or to exclude the presence of monomers and/or polymers containing glycidyl groups. All particulate materials may sometimes be excluded, although exceptions may be made in some cases for silica particles, crosslinked poly(methyl methacrylate) particles, and/or positively charged particles. Anionic antistatic agents may sometimes be excluded.

In some embodiments of the invention, the coating composition may include a binder consisting of one or more aqueous solution or emulsion polymers such as acrylic polymers. Adding a binder resin can impart certain desirable properties, depending on the needs of the application. For example, including an acrylic may make the antistat layer printable. Nonetheless, in some embodiments of the invention, certain polymers are best excluded from the coating composition used to make the antistatic layer. These may include any or all of the following: polyesters, polyurethanes, epoxy resins, vinyl resins, polyether resins, and neutral (i.e., non-anionic, non-cationic and non-amphoteric) polymers comprising units of substituted or unsubstituted acrylate ester monomers and/or substituted or unsubstituted acrylamide monomers. In some embodiments, no polymers of any sort other than cationic antistatic polymers and crosslinkers are present in the coating composition. Cationic antistatic polymers other than those incorporating repeat units according to formula (I) may also be excluded in some embodiments. In some embodiments, non-antistatic polymers other than crosslinkers may be excluded, as may emulsion polymers or other non-water soluble polymers. Typically, anionic polymers and/or anionic surfactants are excluded from the coating composition.

Polyester Substrate

The polyester substrate includes a crystalline polyester prepared from the polycondensation of one or more glycols or diols (such as ethylene or propylene glycol or butanediol) with one or more diacids or esters (typically methyl esters) thereof. Suitable diacids include terephthalic acid, naphthalene dicarboxylic acid, isophthalic acid, diphenic acid and sebacic acid. Exemplary polyester films useful in the present invention include polyethylene terephthalate (PET), polyethylene naphthalate (PEN), polypropylene terephthalate, and polybutylene terephthalate, or mixtures of these, or copolyester films in which any one of the above mentioned polyesters is present. For example, a film of polyethylene terephthalate/isophthalate (PETIP) copolyester may be used according to the invention. Another suitable example is film made from a copolyester of PET and PEN. Typically, PET will be used.

In the typical manufacture of polyester film, polyester resin is melted and extruded as an amorphous sheet onto a polished revolving casting drum to form a cast sheet of the polymer. Thereafter, the cast sheet of polymer is heated to just above its glass transition temperature, 80° C. to 100° C. for polyethylene terephthalate, and is generally stretched or drawn in one or more directions. Typically it is stretched in two directions: the direction of extrusion (longitudinal direction), and perpendicular to the direction of extrusion (transverse direction) to produce a biaxially orientated film. The first stretching, which imparts strength and toughness to the film, conventionally increases the original length of the film by a factor of from about 2.0 to about 4.5. Subsequent stretching steps each also increase the size of the film about 2.0 to about 4.5 times. Generally, it is preferred to stretch first in the longitudinal direction and then in the transverse direction. The film is then heat set, generally at a temperature in the range of about 190° C. to 240° C. for polyethylene terephthalate, to lock in the strength, toughness, and other physical properties, and then cooled down prior to winding on a roll.

Coating the Polyester Substrate

Coating compositions for use according to the invention are in the form of solutions in a volatile diluent, which may include a solvent. In some embodiments, all of the components of the composition are dissolved in the volatile diluent, and thus the composition is a solution. In some embodiments, however, the composition may contain some dispersed material, for example an acrylic emulsion. In most cases, the diluent will be aqueous, which as used herein means that the diluent is at least 50 wt % water. In most embodiments, the aqueous diluent is at least 90 wt % water, and in many cases it will be 100 wt % water. Such solutions will typically have dry solids in a range from about 0.5 to 15 wt %, and more typically in a range of about 2 to 5 wt % for in-line gravure roll application after one-way stretch, but can be greater for other application methods. As used herein, "dry solids" refers to the amount of non-volatile material present in the coating composition, i.e., material that remains in the coating after drying, even though some of the non-volatile material may be a liquid at room temperature. All of the antistat compounds and surfactants are considered non-volatile for purposes of calculating dry solids.

The viscosity of the coating composition will typically be in a range from 1 to 100 mPas for gravure-type coating methods, but can be much greater for other coating methods.

Any conventional coating method, such as spray coating, roll coating, slot coating, meniscus coating, immersion coating, wire-bar coating, air knife coating, curtain coating, doctor knife coating, direct and reverse gravure coating, and the like, may be used to apply the coating composition. The coating is typically applied as a continuous wet coating having a thickness in a range from about 0.5 to 30 microns, and more typically in a range of about 1.5 to 6 microns, as measured by a wet infrared gauge. After drying, the coating typically has a thickness in a range from about 100 to 1500 Å, typically from about 100 to 1000 Å, and more typically in a range of about 150 to 500 Å.

In other embodiments of the invention, a conventional off-line coating process may be used, using any of the wide variety of coating methods known in the art. However, the ability to use in-line coating confers advantages of economy and efficiency over off-line processes (in which the coating step is conducted after the manufacture of the polyester substrate has been completed) because off-line processes may involve organic solvents and/or require the user to employ inconvenient and costly drying procedures. In contrast, in-line coating by the manufacturer provides a customer with a ready-to-use film, thereby saving the customer from having to provide time and equipment to unwind the uncoated film, coat it, and then rewind it.

If an in-line process is used, the coating composition is typically applied before final drawing of the film. For a uniaxially drawn film, the coating composition is preferably applied after drawing. For a biaxially or monoaxially oriented film, the coating composition is typically applied during an interdraw stage, that is, after the film has already been stretched but prior to a second stretching.

In some embodiments, the surface of the polyester substrate opposite the antistatic layer may be coated with a "slip coating" comprising a particulate material in order to assist in the handling of the film, for instance to improve windability and minimize or prevent "blocking". Such a coating may for example be applied in-line before or after film orientation and before final winding. Suitable slip coatings may comprise potassium silicate, such as that disclosed in, for example, U.S. Pat. Nos. 5,925,428 and 5,882,798, the disclosures of which is incorporated herein by reference. Alternatively, the slip coating may comprise a discontinuous layer of an acrylic and/or methacrylic polymeric resin, optionally further comprising a cross-linking agent, as disclosed in, for example, EP-A-0408197. In some embodiments, particles may be added to the antistat coating to provide slip. Exemplary slip particles include silica and crosslinked poly(methyl methacrylate) beads. Filler particles that provide slip may also be dispersed in the polyester substrate film or included in a layer coextruded on it.

EXAMPLES

Glossary

EMULGEN® A60—Polyoxyethylene distyrenated phenyl ether, a nonionic surfactant available from Kao Specialties Americas, LLC, High Point, N.C., used herein as a 20% aqueous solution.

ADOGEN® 477E—tallow diamine pentamethyl dichloride ("quaternary ammonium compounds, N,N,N,N',N'-pentamethyl-N'-tallow alkyl trimethylenedi-, chlorides"), 56 wt % (as measured) in ethanol, available from Evonik Goldschmidt Corporation, Hopewell, Va.

CYASTAT® SN—stearamidopropyldimethyl-2-hydroxyethylammonium nitrate, a 50% solution in a 50:50 isopropanol-water mixture, available from Cytec Industries Inc., West Paterson, N.J. The structure is shown below.

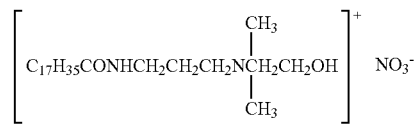

CYASTAT® SP—stearamidopropyldimethyl-2-hydroxyethylammonium dihydrogen phosphate, a 35% solution in a 50:50 isopropanol-water mixture, available from Cytec Industries Inc.

EPOCROS™ WS—300-10 wt % aqueous solution of oxazoline-functional water-soluble acrylic copolymer, available from Nippon Shokubai Co., LTD, Osaka, Japan Polymer A—a 35 wt % aqueous solution of a cationic homopolymer having the structure shown below.

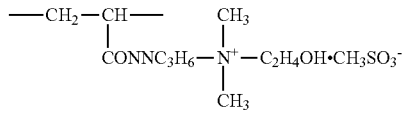

Acrylic Binder—a 45% solids emulsion of an acrylic copolymer of composition methyl methacrylate/ethyl acrylate/acrylonitrile/N-methylolacrylamide.

Test Procedures

Static Decay Test

Equipment: Monroe Static Analyzer Model 276A

Procedure: Full-scale voltage was set at 2000V. Test sequence selected was 10 sec charging, 60 sec dark decay. Peak voltage, time for the static charge to decay to one-half of the peak voltage, time for the static charge to decay to one-tenth of the peak voltage, and time for the static charge to decay to <5V (full decay) were recorded.

Surface Resistivity Test

Equipment: Digital electrometer (Keithley Model 617), Resistivity adapter/circular electrodes (Keithley Model 6105), and Blue M Model WP-4800 Humidity Chamber with glove ports for access.

Procedure:

The voltage source was set to 100.0 V and operated at 2 mA MAX.

Film samples approximately 3½"×3½" in size were conditioned in the humidity chamber for at least 20 minutes. Readings were taken 30 sec after the resistivity adapter was closed and latched.

Calculation:

Surface resistivity (log ohms/sq)=log (5340/microamps [from the digital display])+amperage exponent (exponents are: milliamps=3, microamps=6, nanoamps=9, picoamps=12)

Example 1

Coating compositions 1 and 2 were prepared as shown in Table 1, and coated by interdraw gravure-coating (i.e., coating between the two stages of the biaxial orientation) onto the "A" layer of a polyester film having an AB coextruded structure. The "A" layer was a silica-filled (rough surface) PET layer, and the "B" layer was clear unfilled PET. Each coating was subsequently diluted, keeping the surfactant level the same on total solution, to produce coatings with lower dry thickness. The properties of the coatings made from the undiluted and diluted compositions are shown in Table 3, designated A and B respectively, along with results for two other antistat coatings (3 and 4, prepared in Example 2 below) and five commercially-available antistat-coated PET films.

TABLE 1

|  | % sol | soln 1 | % Dry solids solids | total | no surfactant | soln 2 | % Dry solids solids | total | no surfactant |
|---|---|---|---|---|---|---|---|---|---|
| Demin water |  | 50.00 |  |  |  | 50.00 |  |  |  |
| Emulgen A60 | 20 | 4.95 | 0.99 | 36.48 |  | 4.98 | 1.00 | 25.46 |  |
| Adogen 477E | 56 | 2.21 | 1.24 | 45.61 | 71.8 |  |  |  |  |
| Cyastat SN | 50 |  |  |  |  | 3.92 | 1.96 | 50.10 | 67.2 |
| Polymer A | 35 | 1.20 | 0.42 | 15.48 | 24.4 | 2.36 | 0.83 | 21.12 | 28.3 |
| Epocros WS-300 | 10 | 0.65 | 0.07 | 2.40 | 3.8 | 1.28 | 0.13 | 3.27 | 4.4 |
| NaOH | 1 | 0.09 | 0.00 | 0.03 | 0.1 | 0.18 | 0.00 | 0.05 | 0.1 |
| Demin water |  | 40.90 |  |  |  | 37.28 |  |  |  |
| Total |  | 100.00 | 2.71 | 100.00 | 100.0 | 100.00 | 3.91 | 100.00 | 100.0 |

Example 2

Coating compositions 3 and 4 were prepared as shown in Table 2 and similarly coated interdraw onto a single-layer PET film containing glass-bead-milled 13X zeolite particles. Again, each coating was diluted, keeping the surfactant level the same on total solution, to produce coatings with lower dry thickness. The properties of the coatings are shown in Table 3.

TABLE 2

|  | % sol | soln 3 | % Dry solids solids | total | no surfactant | soln 4 | % Dry solids solids | total | no surfactant |
|---|---|---|---|---|---|---|---|---|---|
| Demin water |  | 50.00 |  |  |  | 50.00 |  |  |  |
| Emulgen A60 | 20 | 4.99 | 1.00 | 26.22 |  | 4.99 | 1.00 | 23.18 |  |
| Adogen 477E | 56 | 3.60 | 2.02 | 52.97 | 71.8 |  |  |  |  |
| Cyastat SN | 50 |  |  |  |  | 4.45 | 2.23 | 51.67 | 67.3 |
| Polymer A | 35 | 1.96 | 0.69 | 18.02 | 24.4 | 2.68 | 0.94 | 21.78 | 28.4 |
| Epocros WS-300 | 10 | 1.06 | 0.11 | 2.79 | 3.8 | 1.45 | 0.15 | 3.37 | 4.4 |
| Demin water |  | 38.39 |  |  |  | 36.43 |  |  |  |
| Total |  | 100.00 | 3.81 | 100.00 | 100.0 | 100.00 | 4.31 | 100.00 | 100.0 |

TABLE 3

| Sample ID | Meas Dry Thickness (A) |  | SR at 50% RH log ohm/sq) | SR at 35% RH (log ohm/sq) | Peak Voltage | SD measured at 22-24% RH sec to ½ Decay | sec to ⅒ Decay | sec to Full Decay |
|---|---|---|---|---|---|---|---|---|
| 1A | 243 | Before | 8.94 | 9.68 | 188 | 2.01 | 2.01 | 2.61 |
|  |  | After* | 9.28 | 9.87 | 245 | 1.81 | 2.01 | 2.41 |
| 1B | 196 | Before | 9.42 | 10.20 | 149 | 1.73 | 2.01 | 2.21 |
|  |  | After* | 10.30 | 10.98 | 752 | 2.51 | 5.28 | 13.1 |
| 2A | 332 | Before | 9.70 | 10.42 | 140 | 1.63 | 2.03 | 2.21 |
|  |  | After* | 9.84 | 10.50 | 786 | 1.95 | 3.15 | 6.06 |
| 2B | 253 | Before | 9.99 | 10.89 | 373 | 1.85 | 2.27 | 3.25 |
|  |  | After* | 10.40 | 11.00 | 834 | 2.77 | 6.92 | 16.26 |
| 3A | 196 | Before | 9.16 | 9.79 | 407 | 0.98 | 2.13 | 4.78 |
|  |  | After* | 9.45 | 10.00 | 502 | 1.15 | 2.64 | 6.07 |
| 3B | 115 | Before | 9.44 | 10.15 | 523 | 1.20 | 2.70 | 6.57 |
|  |  | After* | 10.56 | 11.31 | 923 | 12.25 | 44.09 | 58.43 |
| 4A | 360 | Before | 9.60 | 10.29 | 454 | 0.65 | 1.42 | 2.73 |
|  |  | After* | 9.78 | 10.37 | 530 | 0.90 | 1.86 | 3.45 |

TABLE 3-continued

| Sample ID | Meas Dry Thickness (A) | | SR at 50% RH log ohm/sq) | SR at 35% RH (log ohm/sq) | Peak Voltage | SD measured at 22-24% RH | | |
|---|---|---|---|---|---|---|---|---|
| | | | | | | sec to ½ Decay | sec to 1/10 Decay | sec to Full Decay |
| 4B | 254 | Before | 9.81 | 10.46 | 534 | 0.75 | 2.83 | 6.21 |
| | | After* | 10.03 | 10.61 | 715 | 1.27 | 4.01 | 10.72 |
| Commercial Film #1 | | Before | 10.46 | 11.11 | 312 | 4.62 | 31.3 | 61.2 |
| | | After* | — | 10.55 | 313 | 5.02 | 29.9 | 56.2 |
| Commercial Film #2 | | Before | 10.4 | 11.3 | 822 | 2.31 | 5.22 | 14.45 |
| | | After* | 12.2 | 12.1 | 1068 | 5.22 | 18.67 | 67.04 |
| Commercial Film #3 | | Before | 9.99 | 11.63 | 1130 | 7.80 | 69.0 | 81.1 |
| | | After* | 12.22 | 13.81 | 1156 | 69.6 | 80.3 | 86.1 |
| Commercial Film #4 | | Before | 8.9 | 9.4 | 239 | 3 | 58 | 69 |
| | | After* | 9.3 | 9.8 | 279 | 1 | 7 | 42 |
| Commercial Film #5 | | Before | 10.52 | 11.18 | 444 | 1.85 | 2.43 | 3.89 |
| | | After* | 11.18 | 11.65 | 1064 | 4.19 | 17.2 | 61.7 |

*After wiping film with a cotton cloth 10 times
The commercial films are believed to include the following antistatic agents:
Film 1 poly(3,4-ethylenedioxythiophene)
Film 2 stearamidopropyldimethyl-2-hydroxyethylammonium nitrate
Film 3 potassium phosphate
Film 4 unknown
Film 5 lithium trifluoromethane sulfonate Because antistatic coatings usually have humectant properties, there is often a tendency for the antistat to be easily removed from the surface. Therefore, Surface Resistivity (SR) and Static Discharge (SD) measurements were obtained under different relative humidity (RH) conditions before and after wiping the films with a cotton cloth 10 times to simulate customer handling of the film. The results are shown in Table 3, where lower numbers indicate better performance.

As can be seen, the inventive antistatic coatings provided excellent surface resistivities both at 50% RH (8.9-10.0 log ohm/sq) and at 35% RH (9.7-10.9 log ohm/sq). The 35% RH figures are more important, since static electricity is more of a problem under drier conditions. The commercial films exhibited a range of surface resistivities, varying by more than an order of magnitude, and only film #4 performed comparably to the inventive coatings at 50% and 35% RH.

Commercial film #4 was, however, significantly poorer than the inventive films with respect to speed of static charge decay, which is more indicative of in-use is performance than are surface resistivity measurements. Static discharge measurements at 22-24% RH showed superior performance for the inventive coatings, with films charging up to only 140-530 V and then decaying rapidly. Elapsed times for the charge to decay to 10% of the original value were approximately 2 sec or less for the best coatings.

Performance of the commercial films varied considerably with respect to charge decay. The best charged up to 240 to 440 V but, with one exception, the decay times were significantly longer than for the inventive films. Only commercial film #5 provided good charge decay: 2.4 sec to decay to 10% of the original value, but its surface resistivity was higher than that of the inventive films.

After wiping, the surface resistivities of the inventive films increased by less than one order of magnitude. Increases in the times for static charge to decay to 10% were low, ranging from none to approximately 3×. The exception, coating 3B, had coating thickness below the optimum range. While several commercial films (#1 and #4) were resistant to loss of static discharge performance after wiping, they nonetheless showed poorer absolute performance than the best of the films using the inventive coatings.

The inventive film 1A had the best overall performance, with low surface resistivity, a low tendency to accept charge, a 2 sec time to decay to 10% of the original charge, and little diminution in performance after wiping. The other inventive films performed nearly as well overall, and noticeably better overall than the commercial films.

Example 3

The level of surfactant does not significantly affect the static dissipative properties of the coatings. Table 4 shows a coating, sample 5, with a lower surfactant level than in the previous examples. It was coated on film described in Example 2. SR values were 9.6 at 50% RH and 10.4 at 35% RH. The maximum voltage in charge decay testing was 408 V and decay times were 1.79 sec to ½ decay, 2.78 sec to 1/10 decay, and 4.90 sec to full decay.

TABLE 4

| | | | | % Dry solids | |
|---|---|---|---|---|---|
| | % sol | 5 | soln solids | total | no surfactant |
| Demin water | | 50.00 | | | |
| Emulgen A60 | 20 | 0.75 | 0.15 | 3.61 | |
| Cyastat SN | 50 | 5.38 | 2.69 | 64.82 | 67.3 |
| Polymer A | 35 | 3.24 | 1.13 | 27.33 | 28.4 |
| Epocros WS-300 | 10 | 1.76 | 0.18 | 4.24 | 4.4 |
| Demin water | | 38.87 | | | |
| Total | | 100.00 | 4.15 | 100.00 | 100.0 |
| Dry Coating Thickness (A) | | 230 | | | |

Example 4

Acrylic and other emulsions can be incorporated into the coatings with increases in dry coating thickness to maintain antistat performance. Table 5 shows two coating formulations that were applied interdraw with a Meyer bar on unfilled PET to a calculated dry coating thickness of 1330 Å. Antistat performance was very good, as seen in Table 6.

TABLE 5

| | % sol | soln 6 | % Dry solids solids | % Dry solids total | % Dry solids no surfactant | soln 7 | % Dry solids solids | % Dry solids total | % Dry solids no surfactant |
|---|---|---|---|---|---|---|---|---|---|
| Demin water | | 50.00 | | | | 50.00 | | | |
| Emulgen A60 | 20 | 5.00 | 1.00 | 8.11 | | 5.00 | 1.00 | 8.11 | |
| Cyastat SN | 50 | 14.07 | 7.04 | 57.07 | 62.1 | | | | |
| Cyastat SP | 35 | | | | | 20.06 | 7.02 | 56.96 | 62.0 |
| Acrylic Binder | 45 | 1.62 | 0.73 | 5.91 | 6.4 | 1.63 | 0.73 | 5.95 | 6.5 |
| Polymer A | 35 | 9.47 | 3.31 | 26.89 | 29.3 | 9.49 | 3.32 | 26.95 | 29.3 |
| Epocros WS-300 | 10 | 2.43 | 0.24 | 1.97 | 2.1 | 2.44 | 0.24 | 1.98 | 2.2 |
| NaOH to pH 6.5-7.0 | 1 | 0.63 | 0.01 | 0.05 | | 0.63 | 0.01 | 0.05 | |
| Demin water | | 16.15 | | | | 10.12 | | | |
| Total | | 99.37 | 12.33 | 100.00 | 100.0 | 99.37 | 12.33 | 100.00 | 100.0 |

TABLE 6

| | | | SD measured at 50% RH | | |
|---|---|---|---|---|---|
| Sample ID | | 35% RH (log ohm/sq) | Peak Voltage | sec to ½ Decay | sec to ⅒ Decay | sec to Full Decay |
| 6 | Before | 10.46 | 470 | 1.91 | 2.41 | 3.41 |
| | After* | 10.68 | 427 | 1.91 | 2.11 | 3.01 |
| 7 | Before | 11.40 | 779 | 2.31 | 4.82 | 12.04 |
| | After* | 11.29 | 891 | 2.81 | 6.22 | 14.05 |

*After wiping film with a cotton cloth 10 times

Good antistat performance was achieved with samples 6 and 7, both of which contained an added acrylic emulsion.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. An antistatic polyester film, comprising a self-supporting polyester substrate film bearing on at least one surface thereof an antistatic layer formed from a coating composition comprising
   a) one or more antistatic polymers comprising repeat units according to formula (I)

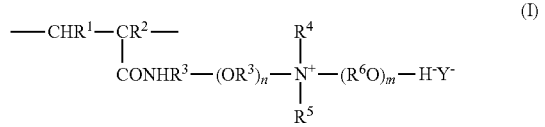

(I)

wherein $R^1$ and $R^2$ are each independently H or $CH_3$, $R^3$ is an alkylene group having a carbon number in a range from 2 to 10, $R^4$ and $R^5$ are each independently a saturated hydrocarbon group having a carbon number in a range from 1 to 5, $R^6$ is an alkylene group having a carbon number in a range from 2 to 5, n is an integer in a range from 0 to 40, m is an integer in a range from 1 to 40, and $Y^-$ is a halogen ion, nitrate ion, sulfate ion, alkylsulfate ion, sulfonate ion, alkylsulfonate ion or dihydrogen phosphate ion;
   b) one or more nonpolymeric cationic antistatic agents, in total constituting at least 30 wt % of the coating composition on a dry solids basis, not including surfactant or any slip particles, wherein the one or more non polymeric cationic antistatic agents comprise tallow diamine pentamethyl dichloride; and
   c) one or more crosslinkers.

2. The film of claim 1, wherein the antistatic layer further comprises one or more nonionic and/or cationic surfactants.

3. The film of claim 1, wherein the one or more crosslinkers include a polymer bearing multiple oxazoline groups.

4. The film of claim 1, wherein the one or more crosslinkers include one or more polymers comprising repeat units according to formula (II)

(II)

wherein $R^7$ and $R^8$ are each independently H or $CH_3$.

5. The film of claim 4, wherein $R^7$ and $R^8$ are each H.

6. The film of claim 1, wherein the antistatic layer does not comprise an emulsion polymer, as a binder.

7. The film of claim 1, wherein the antistatic layer does not comprise a non-antistatic polymer other than a polymeric crosslinker.

8. The film of claim 1, wherein $R^1$ and $R^2$ are each H, $R^3$ is $(CH_2)_3$, n is zero, $R^4$ and $R^5$ are each $CH_3$, and m is 1.

9. The film of claim 1, wherein $Y^-$ is $CH_3SO_3^-$.

10. The film of claim 1, wherein the antistatic layer further comprises slip particles.

11. The film of claim 10, wherein the slip particles comprise silica and crosslinked poly(methyl methacrylate) beads.

12. The film of claim 1, wherein the antistatic layer further comprises a binder.

13. The film of claim 12, wherein the binder comprises an emulsion polymer.

14. The film of claim 12, wherein the binder is an acrylic copolymer of composition comprising methyl methacrylate, ethyl acrylate, acrylonitrile and N-methylolacrylamide.

15. The film of claim 1 further comprising a slip coating on a surface of the polyester substrate opposite the antistatic layer.

16. The film of claim 15, wherein the slip coating comprises a discontinuous layer of an acrylic and/or methacrylic polymeric resin and optionally further comprises a crosslinking agent.

17. The film of claim 15, wherein the slip coating comprises a particulate material.

* * * * *